United States Patent [19]
Desai et al.

[11] Patent Number: 5,411,616
[45] Date of Patent: May 2, 1995

[54] METHOD FOR ULTRASONICALLY WELDING THIN-WALLED COMPONENTS

[75] Inventors: Venus D. Desai, Plantation; Michael M. Austin, Pompano Beach; Steven Fischl, Sunrise, all of Fla.

[73] Assignee: Motorola, Inc., Schaumburg, Ill.

[21] Appl. No.: 169,028

[22] Filed: Dec. 20, 1993

[51] Int. Cl.⁶ .............................................. B32B 31/16
[52] U.S. Cl. ................................. 156/73.1; 156/580.1
[58] Field of Search ................. 156/73.1, 219, 580.1, 156/580.2; 264/23

[56] References Cited
U.S. PATENT DOCUMENTS

| | | | |
|---|---|---|---|
| 4,169,751 | 10/1979 | Yen | 156/73.1 |
| 4,564,932 | 1/1986 | Langé | 156/73.1 X |
| 4,795,511 | 1/1989 | Wouters et al. | 156/73.1 |
| 5,011,555 | 4/1991 | Sager | 156/73.1 |
| 5,238,717 | 8/1993 | Boylan | 428/35.7 |

Primary Examiner—David A. Simmons
Assistant Examiner—J. Sells
Attorney, Agent, or Firm—Kenneth M. Massaroni

[57] ABSTRACT

A process for joining at least two ultrathin plastic pieces by an ultrasonic welding method is disclosed. The process includes providing a plurality of energy directors for enhancing weld strength, and reducing unacceptable welds. The process also includes providing a groove in a flanged attachment member to assist in properly orienting the pieces to be joined.

2 Claims, 3 Drawing Sheets

METHOD FOR ULTRASONICALLY WELDING THIN-WALLED COMPONENTS

TECHNICAL FIELD

This invention relates in general to the field of ultrasonic welding, and in particular to ultrasonically welding thin-walled components.

The demand for small, light-weight consumer products has increased substantially in recent years. This demand for smaller, lighter-weight products has forced manufacturers of these products to employ ultrathin ultralight products in, for example, the plastic housing of the products. These ultrathin plastic housings often have thicknesses on the order of between 0.20 and 0.50 mm.

These thin plastic housings are low weight, and rely upon the structure of the item being housed for structural stability. However, they pose several challenges in the manufacturing arena, and particularly, in joining two or more such plastic pieces. Typically, ultrathin plastic parts must be bonded together with adhesives because standard ultrasonic welding techniques are not feasible.

Traditionally, thick plastic parts have been joined ultrasonically by aligning the parts, and initiating the weld along an energy director formed in one of the parts. Manufacturers have typically strengthened the ultrasonic weld between plastic parts by either increasing the weld depth, or increasing the size of the energy director, thus providing a larger weld area. However, adopting this approach with ultrathin plastic components results in numerous problems. For example, increased weld depth and/or energy director size also increases the likelihood of burning through one or more of the plastic parts, thus rendering the parts unusable. Deep welds also cause "flash" or seepage of the weld from between the welded components. Welds which completely melt one or both of the parts degrade the plastic, causing concentrated stresses at the weld joint.

Another problem associated with ultrasonically joining plastic parts arises from the tendency of the plastic parts to become mis-aligned during the welding process. The result is misformed parts which are at least cosmetically unacceptable, and at worst lacking in structural integrity.

Accordingly, there exists a need for a method of ultrasonically welding parts, particularly ultrathin plastic parts, which provides for enhanced weld strength, and improved part alignment.

SUMMARY OF THE INVENTION

Briefly, according to the invention, there is provided a method for ultrasonically joining at least a first and a second piece of plastic material via ultrasonic welding. The method comprises the steps of providing a plurality of energy directors around the peripheral edge of a bonding surface of said first plastic piece. The energy directors may be, for example, two or more sets of elongated, raised ridges extending from the bonding surface. Alternatively, the energy directors may be a plurality of raised, discrete cones extending from the bonding surface. The second piece to be joined may include a grooved flange around the peripheral edge. The groove in the flange is adapted to seat into the energy directors. Thereafter, the first and second pieces are brought into contact with one another so that said groove is seated in said plurality of energy directors. Pressure is applied to said plastic pieces to hold them in seated relationship. Finally ultrasonic welding energy is applied to said parts so that the energy directors melt, engaging the groove.

DETAILED DESCRIPTION OF THE PREFERRED EMBODIMENT

Figure 1:
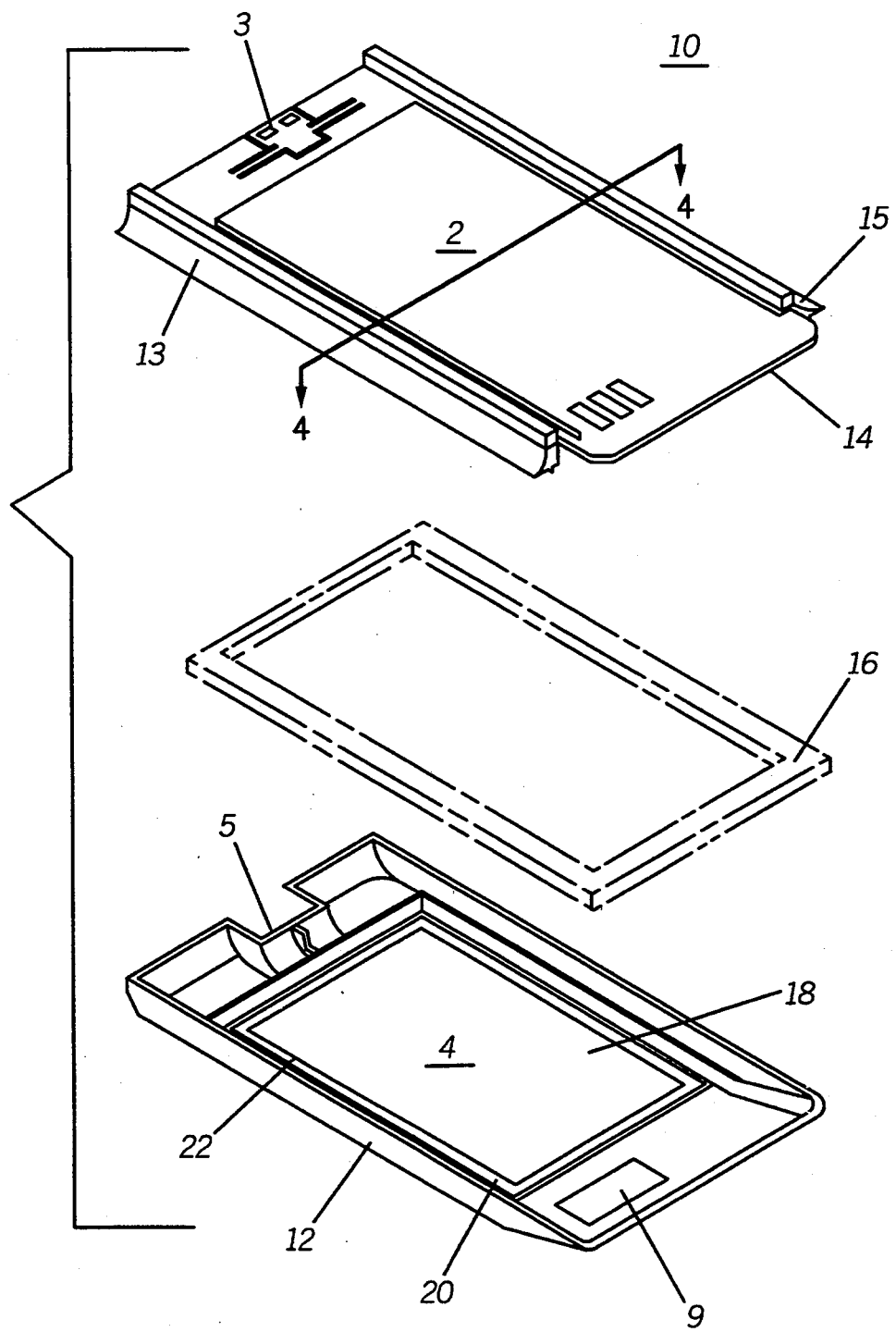
FIG. 1 is an exploded perspective view of a plastic housing to be joined by a method in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an exploded perspective view of a plastic housing 10 to be joined by a method in accordance with the invention. The housing 10 comprises a housing base 12 and a housing cover 14. The housing 10 illustrated in FIG. 1 is adapted to house a battery cell 16 (in phantom) for use in, for example, a portable telephone. However, it is to be understood that the invention is not so limited, and that the invention may be advantageously employed in joining any two plastic members, for any application. The housing base 12 and the cover 14 are typically fabricated of a thermoplastic material, such as, but not limited to Polycarbonate. The thickness of the thermoplastic material is typically between 0.20 and 0.50 mm. Accordingly, deep welds are not possible, as they will burn through the housing base 12, the cover 14, or both.

The housing cover 14 includes flanges 13, 15 extending from the edges thereof. Protruding from one side of the flanges 13, 15 is a groove. The groove is adapted to seat into energy directors (described below) so as to allow for better weld quality, and to assure proper alignment of the housing cover 14, and the housing base 12.

The housing base 12 may have a bonding surface 18 adapted to engage, for example, the item to be housed. The bonding surface 18 also provides a base for ultrasonically welding the housing cover 12.

Disposed around the peripheral edge of the housing base 12 is a plurality of energy directors 20 and 22. As illustrated in FIG. 1, the energy directors 20, 22 comprise two sets of elongated, raised ridges. However, as will be discussed in greater detail below with respect to FIG. 3, the energy directors may be a plurality of discrete, raised cones.

Figure 2:
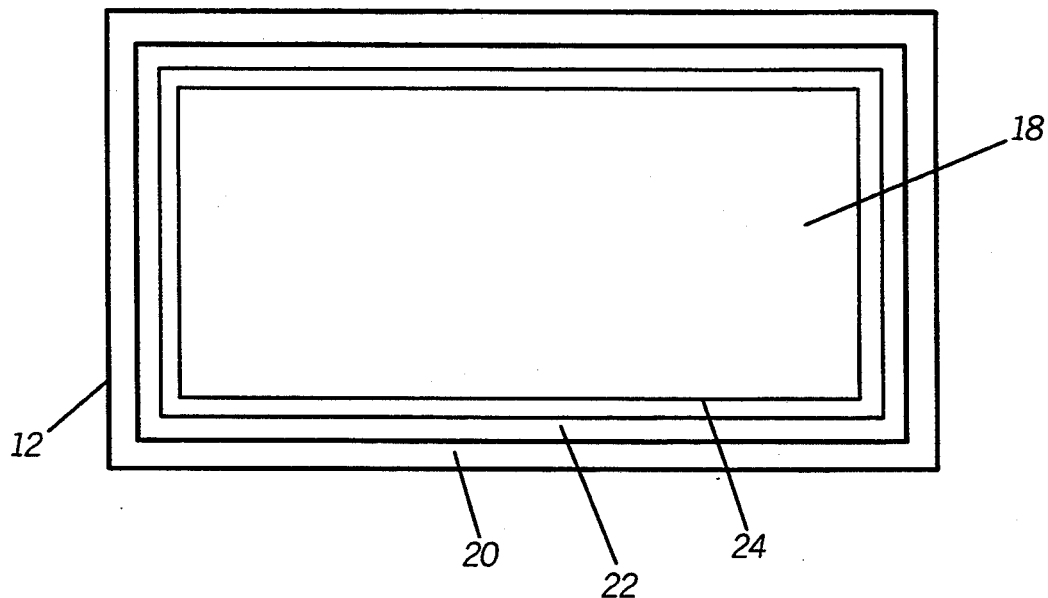
FIG. 2 is a top plan view of the bonding surface of a first piece of a housing to be joined by a method in accordance with the invention.

Referring now to FIG. 2, there is illustrated therein a top plan view of the housing base 12, having the energy directors configured as a plurality of elongated, raised ridges extending from the bonding surface 18. In this embodiment, the energy directors comprise three sets of elongated, raised ridges 20, 22, 24, extending from the bonding surface 18 of the housing base 12. The three sets of elongated raised ridges 20, 22, 24 are disposed around the peripheral edge of the bonding surface 18, although they may be disposed anywhere on the bonding surface. The periphery has been chosen so as to accommodate the battery pack illustrated in phantom in FIG. 1.

The raised ridges are typically formed integrally with the formation of the housing base 12, and hence are formed of a similar thermoplastic material. The raised ridges may be continuous, as illustrated in FIG. 2, or alternatively may be broken, or non-continuous so as to accommodate the item to be housed in the housing 10. The ridges may extend from the bonding surface a distance so as to make calculated interference between the first and second pieces, and usually extend between 0.20 and 0.70 mm. Further, each ridge may extend a different distance so as to strengthen the weld, while further reducing flash. The ridges may be shaped as a generally rectangular member, with a pointed termination on the end extending from the bonding surface 18. Alternatively, the ridges may be of other shapes, such as, but not limited to triangular or semicircular.

Figure 3:
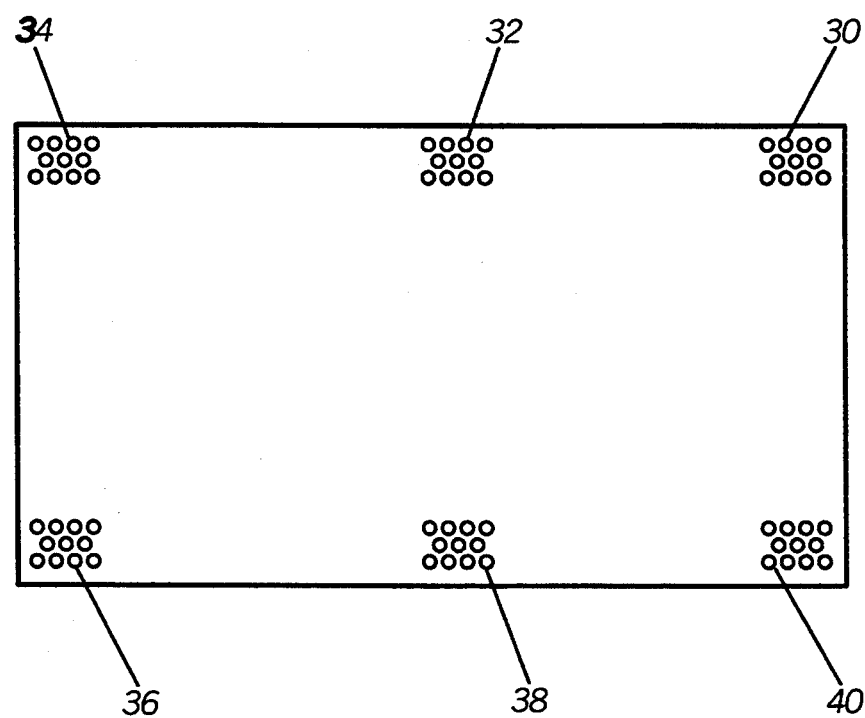
FIG. 3 is a top plan view of the bonding surface of an alternative first piece of a housing to be joined by a method in accordance with the invention.

Referring now to FIG. 3, there is illustrated therein an alternative embodiment of the invention, wherein the energy directors are configured as a plurality of discrete raised cones. The cones are arranged in groups 30, 32, 34, 36, 38, 40 around the periphery of the bonding/surface 18. While FIG. 3 illustrates six groups of cones, each group consisting of 11 cones, it is to be understood that the invention is not so limited. Rather, any number of groups of cones, having any number of cones therewithin, arranged in any configuration is contemplated by the invention. The cones may extend from the bonding surface a distance so as to make some calculated interference, and usually of a distance of between 0.20 and 0.70 mm.

Figure 4:
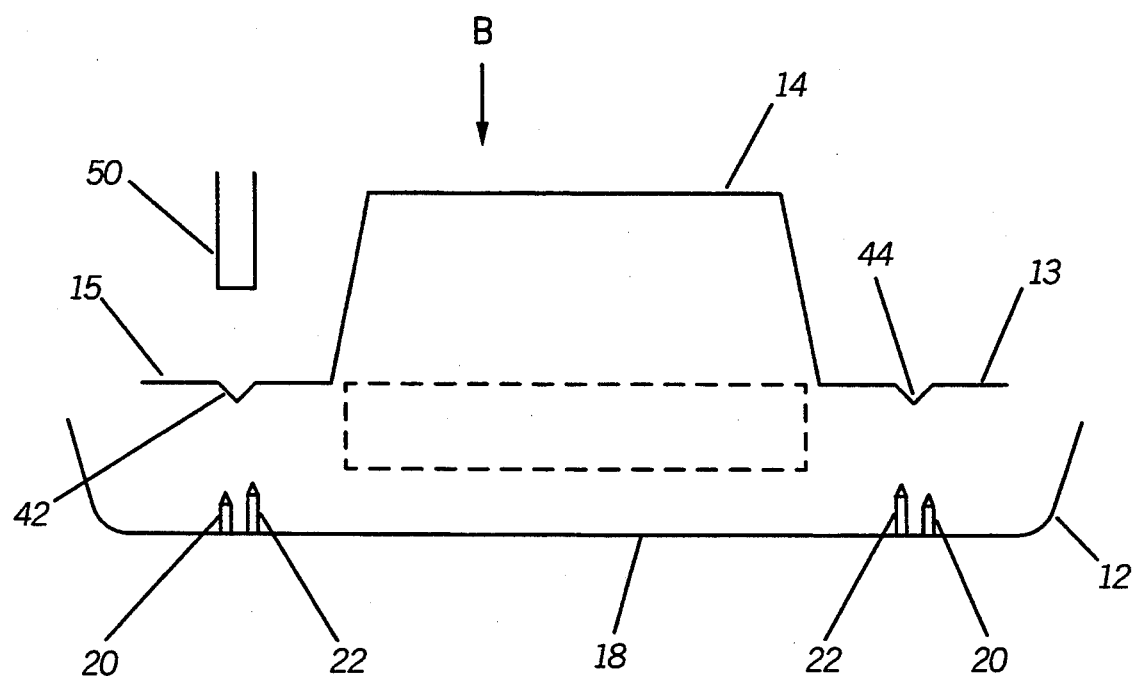
FIG. 4 is a side view of a housing, taken along line 4—4 of FIG. 1.

Referring now to FIG. 4, there is illustrated therein a cross-sectional view taken along line 4—4 of FIG. 1, illustrating the housing base 12, and the housing cover 14. The energy directors are configured as two sets of elongated ridges 20, 22 extending from the bonding surface 18. The ridges are of differing lengths (i.e., ridge 22 extends further from bonding surface 18 than does ridge 20) so as to improve the quality of the weld, while reducing flash. Disposed between the housing cover 14, and the housing base 12 is the item to be housed. The housing cover 14 includes flanges 13, 15 extending from edges thereof. Formed in each flange is a groove 42, 44 which protrudes downwardly from the flange, and toward the housing base 12. The grooves 42, 44 are adapted to seat between the ridges 20, 22 so as to prevent mis-alignment between the housing base 12, and the housing cover 14.

The joining process is completed by first urging housing cover 14 against housing base 12, as by the application of force to cover 14 in the direction of arrow B. Grooves 42 and 44 seat between the ridges 20 22, thus properly aligning the cover and base. Ultrasonic welding is accomplished by the application of welding energy via a welding horn 50 to the flanges 42 and 44. The thermoplastic material is melted achieving the weld.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for ultrasonically joining at least a first and a second piece of plastic material, said method comprising the steps of:

forming a plurality of energy directors around the peripheral edge of a bonding surface of said first plastic piece, said energy directors extending from the bonding surface of said first plastic piece, and comprising at least a first and a second set of elongated, raised ridges, said ridges arranged in parallel fashion;

providing a grooved flange around the peripheral edge said second piece of plastic, the groove in said flange adapted to seat between said first and second set of energy directors;

bringing said first and second pieces into contact with one another so that said groove is seated in said plurality of energy directors;

applying pressure to said plastic pieces to hold them in seated relationship; and applying ultrasonic welding energy to said parts so that said plurality of energy directors engage said groove.

2. A method as defined in claim 1, wherein said first and second sets of energy directors extend different distances from said bonding surface.

* * * * *